Aug. 11, 1931.  A. FICKENSCHER  1,818,468
TRACTOR ATTACHMENT
Filed Dec. 9, 1929  2 Sheets-Sheet 1
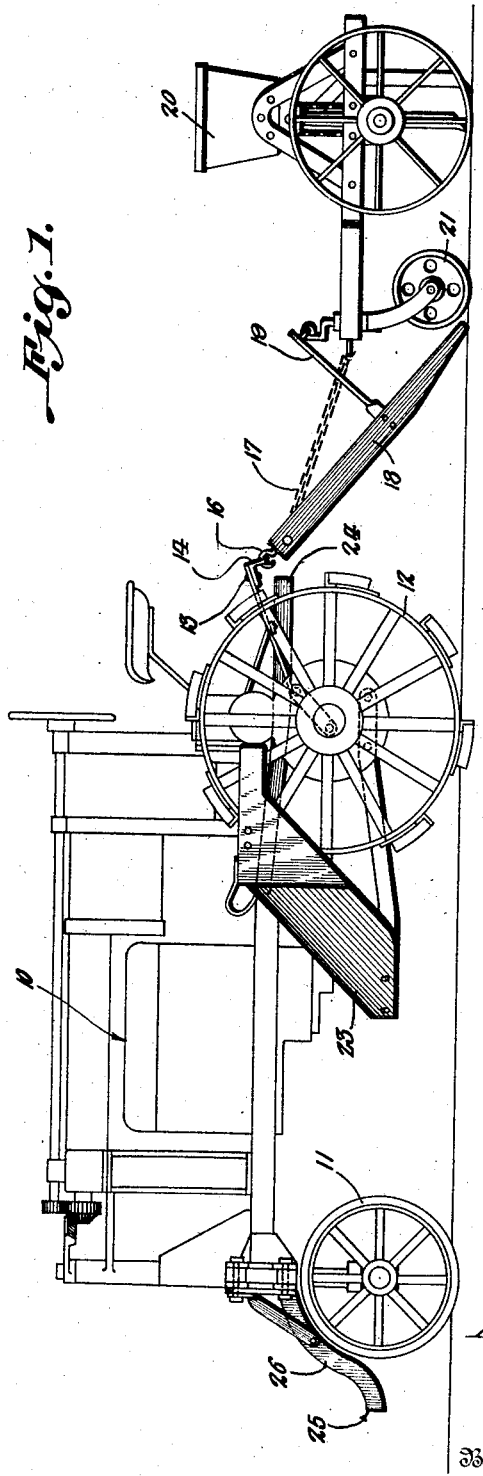
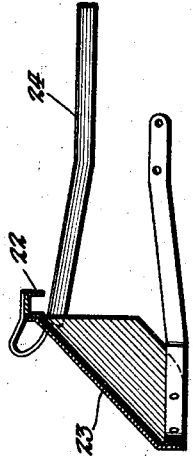
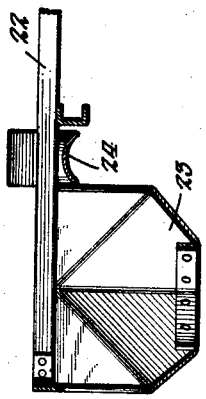
A. Fickenscher, Inventor
By
Attorney

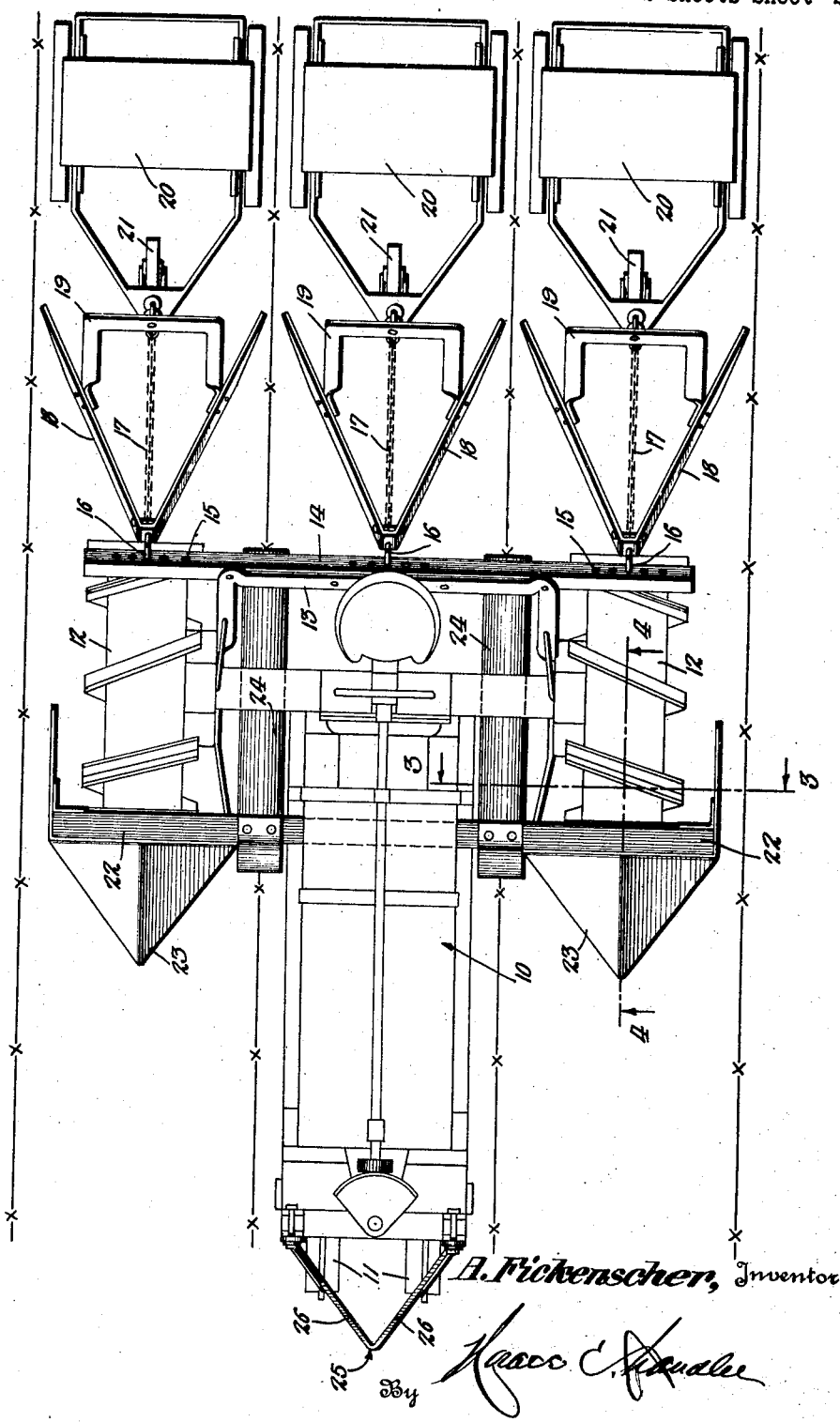

Patented Aug. 11, 1931

1,818,468

UNITED STATES PATENT OFFICE

ADAM FICKENSCHER, OF MOOREFIELD, NEBRASKA

TRACTOR ATTACHMENT

Application filed December 9, 1929. Serial No. 412,804.

This invention relates to new and useful improvements in devices used in connection with the drilling of wheat in a field where corn is already planted and growing.

One object of the invention is to provide a device which is used in association with a tractor by means of which the leaning corn may be properly lifted, so that the tractor may not run thereon, and whereby the wheat may be properly drilled.

Another object is to provide novel and improved means for automatically guiding the wheat drilling device, between the rows of standing corn.

Other objects and advantages will be apparent from the following description when taken in connection with the accompanying drawings.

In the drawings:

Figure 1 is a side elevation of a tractor showing the invention applied thereto.

Figure 2 is a top plan view of the same.

Figure 3 is a vertical transverse sectional view on the line 3—3 of Figure 2, looking forwardly.

Figure 4 is a vertical longitudinal sectional view on the line 4—4 of Figure 2.

Referring particularly to the accompanying drawings, 10 represents the body, 11 the front wheels, and 12 the rear wheels of a tractor, in connection with which the present invention is adapted for use. The rear of the body of the tractor is provided with the usual drawbar 13, and secured to said drawbar, and extending transversely of tractor, is an angle bar 14, said bar having a plurality of series or groups of openings 15, any one of which is adapted to receive the hook 16, of the chain 17, connected with the trailing triangular frame 18. Carried by the rear end of this frame is an upwardly extending arch member 19. Connected with the rear end of the chain 17 is the wheat drill 20, said drill having a caster wheel 21 on its forward end which is connected with the upper portion of said arch, whereby when either side of the triangular frame 18 strikes a stalk of standing corn, such frame will be moved by means of the steering of the caster wheel by such movement of the frame, and thereby restoring the drill to its proper position between the rows of corn. In view of the fact that there are illustrated three groups of openings 15, in the beam or bar 14, it is evident that three drills may be attached thereto, thus permitting three rows to be drilled at the same time. Extending transversely of the tractor, in advance of the rear wheels 12, is a beam 22, the ends of which extend transversely in front of the said wheels, as clearly seen in the plan view, Figure 2. Mounted on each end of this beam 22, and extending downwardly and forwardly therefrom, is a shoe 23, which is adapted to nose beneath the leaning corn, to raise the same to an approximate vertical position. Extending longitudinally between the body of the tractor and each of the rear wheels 12, are the inverted channel members 24, the forward ends of which are secured to the beam 22, while the rear ends are secured to the transverse angle bar 14, by means of the same bolt which attaches the said angle bar to the drawbar 13. Secured on the forward end of the tractor is the downwardly and forwardly extending divider, represented as a whole by the numeral 25, and which consists of the forwardly diverging arms 26, adapted to pass between the rows of corn for the purpose of swerving the corn toward the right and left, to be later directed into the inverted channel members 24, by the shoes 23, for the purpose of preventing the corn being run over by the rear wheels 12, of the tractor.

What is claimed is:

1. An attachment for a tractor including means for separating and lifting corn stalks of adjacent rows, means for holding the stalks out of the path of the traction wheels of the tractor, and means for guiding the stalks to the holding means.

2. An attachment for a tractor including means for diverting the leaning corn of adjacent rows toward the opposite sides of the tractor, means for guiding the lifted stalks between the body and traction wheels of the tractor, and means for directing such stalks to said guiding means.

3. An attachment for a tractor including corn stalk elevating and dividing means on the front of the tractor, channels for guiding the elevated stalks between the tractor and the traction wheels thereof, and means for directing the elevated stalks into the guiding channels.

4. The combination with the body and traction wheels of a tractor, of an attachment therefor including means for lifting leaning corn stalks of adjacent rows out of the path of the said traction wheels, a support mounted transversely of the tractor, an auxiliary drawbar mounted on the drawbar of the tractor, inverted channeled guiding members extending between the traction wheels and the body of the tractor and being connected to said support and said auxiliary drawbar, and means on the ends of the support for diverting the elevated stalks to the channels.

In testimony whereof, I affix my signature.

ADAM FICKENSCHER.